US010945299B2

United States Patent
Yoon et al.

(10) Patent No.: US 10,945,299 B2
(45) Date of Patent: Mar. 9, 2021

(54) OVERSHOOT ANALYSIS BASED ON USER EQUIPMENT METRICS

(71) Applicant: T-Mobile USA, Inc., Bellevue, WA (US)

(72) Inventors: Jong Sung Yoon, Sammamish, WA (US); Leandro L. Recova, Chino, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/455,501

(22) Filed: Jun. 27, 2019

(65) Prior Publication Data

US 2020/0413459 A1    Dec. 31, 2020

(51) Int. Cl.
*H04W 76/11* (2018.01)
*H04W 64/00* (2009.01)
*H04B 17/336* (2015.01)
*H04W 72/04* (2009.01)
*H04W 4/029* (2018.01)

(52) U.S. Cl.
CPC .......... *H04W 76/11* (2018.02); *H04B 17/336* (2015.01); *H04W 4/029* (2018.02); *H04W 64/003* (2013.01); *H04W 72/0473* (2013.01)

(58) Field of Classification Search
None
See application file for complete search history.

(56) References Cited

U.S. PATENT DOCUMENTS

2016/0165472 A1* 6/2016 Gopalakrishnan .... H04W 16/28
455/67.11
2018/0351605 A1* 12/2018 Liang .................. H04B 7/0417

* cited by examiner

*Primary Examiner* — Diane L Lo
(74) *Attorney, Agent, or Firm* — Lee & Hayes, P.C.

(57) ABSTRACT

User equipment (UE) can include a network analyzer to capture network metrics to monitor conditions of cell coverage and coverage overlap. In some instances, the UE is served by a neighboring cell located further away instead of the nearest cell due to coverage overlap. The UE can capture data representing network metrics and can report such data to a network device to further aggregate the data and to generate reports. The network device can use the aggregated data to perform overshooting analysis, which may include determining transmission power of neighboring cells that overlap with coverage of a target cell. The aggregated data may be used to determine an overshoot index for a cell. A cell with high overshoot index may be designated an overshooter cell. The parameters of an overshooter cell may be modified to reduce interference between cells.

17 Claims, 7 Drawing Sheets

RECEIVE, BY A BASE STATION FROM REMOTE NETWORK DEVICE, MESSAGE INFORMING OF INTERFERENCE
702

DETERMINE TO REDUCE DATA TRANSMIT POWER BASED ON THE MESSAGE
704

CONFIGURE THE BASE STATION TO REDUCE DATA COVERAGE AREA
706

DETERMINE TO TILT AN ANTENNA BY A ROTATION VALUE
708

CONFIGURE THE ANTENNA BASED ON THE ROTATION VALUE
710

FIG. 7

OVERSHOOT ANALYSIS BASED ON USER EQUIPMENT METRICS

BACKGROUND

Modern telecommunication systems include heterogeneous mixtures of second, third, and fourth generation (2G, 3G, and 4G) cellular-wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

To provide adequate coverage in wireless communication technologies, cell towers are often placed with intentional signal overlap. This overlap is often used to provide coverage with less dropped calls and to provide smooth handover from one cell to the next. However, significant overlap of strong signals can cause interference in wireless signals, resulting in degraded user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to user equipment including a network analyzer to capture network metrics, and a network device for analyzing the network metrics to perform overshooting analysis. Potential overshooting occurs when a network cell serving a user equipment ("UE," "user device") was not the closest cell to the user equipment when the call was made. A service provider may provide a network analyzer to continuously capture network metrics at the user equipment to facilitate identification of areas where strong signals from one network cell are interfering with signals from another cell. In some instances, the user equipment can capture network metrics which can be provided to a network device to determine aggregated network metrics. The network device can use the aggregated network metrics to identifies instances where the serving network cell was not the closest cell to the user equipment. Those instances may indicate that there is an overshooting issue with that particular cell.

In some instances, an analysis may include determining an overshoot index based on a percentage of instances where a particular cell is the serving cell, but not the closest cell to the user equipment. This overshoot index may then be compared to a threshold to determine whether the cell is an overshooter. If an overshooter is identified, the network device may send a command to remotely adjust a setting of the network cell designated as an overshooter. For instance, the power level of the overshooter network cell may be adjusted (e.g., lowered) based on the magnitude of the overshoot to remotely reduce the overshoot. In some instances, the antenna tilt of the offending network cell can also be adjusted based on the magnitude of the overshoot to reduce overshoot in certain direction. The example remediation techniques are examples and additional techniques are discussed herein.

In some instances, the network analyzer can be implemented as an application or component running on the user equipment configured to interact with an operating system component of the user equipment. The network analyzer can instruct the operating system component to control software and/or hardware associated with a transceiver of the user equipment to monitor conditions at the user equipment and provide metrics (e.g., information about location, cell identifier of the serving network cell, call status, etc.) indicative of the conditions to a network server for subsequent analysis.

In examples, one or more metrics are captured and used to provide overshooting analysis. The one or more metrics captured at the time of a communication may include: the geographical location (e.g., GPS or Wi-Fi based location) of the user equipment (including latitude/longitude and location accuracy), a cell identifier (may also be referred to as "base station identifier") of a cell serving the user equipment, and a signal-to-interference-plus-noise ratio (SINR). The one or more metrics can be sent to the network device for aggregation and determination of an overshoot index for individual network cell. A high overshoot index may indicate that a particular cell is an overshooter. The overshoot index may be used to determine improvements on signal interference from the overshooter, for example, to tune the overshooter cell by changing a direction of one or more antenna or adjusting power, and the like.

By way of example and without limitation, the techniques discussed herein can be implemented on a user equipment configured to capture and report network metrics to a network server in response to establishing voice or data sessions with core network. In some instances, the user equipment will connect to a network cell with the strongest signal, even though that network cell may not be the closest cell to the user equipment. The network server collects the data and identifies instances where the serving network cell was not the closest cell to the user equipment when the call was made. That network cell may be designated as an overshooter. The overshooter cell may be tuned, so that the user equipment will no longer identify the overshooter cell as the strongest signal to connect to when that overshooter cell is not the closest cell to the user equipment.

The systems, devices, and techniques described herein can improve a functioning of a network by capturing network metrics to identify areas where strong signals from one network cell are interfering with signals from another cell and determine to decrease interference in areas with high interference. Increased interference may cause error in transmission and eventually retransmission of the same data. As a result, it will negatively impact the data throughput for users and it may also cause data loss if the application of the data is sensitive to delay such as voice call, resulting in degraded user experience. For example, the systems, devices, and techniques can determine an overshoot index for individual network cell to identify instances where the serving network cell was not the closest cell to the user device when the call was made. Further, determining overshoot index can allow network engineers to tune components (e.g., power level(s), antenna orientation(s), and the like) in a system to decrease signal interference from the offending network cell. Additionally, the systems, devices, and techniques discussed herein provide a distributed framework for network analysis, which provides updated overshoot index for individual network cells to a network server which may automatically and remotely send commands to tune an offending network cell. Moreover, by constantly monitoring the network and updating the overshoot index, the network server may automatically and remotely send commands to retune the previously offending network cell to adjust (e.g., increase or decrease) transmission power, if needed. These and other improvements to the functioning of a computer and network are discussed herein.

The systems, devices, and techniques described herein can be implemented in a number of ways. Example implementations are provided below with reference to the following figures.

Figure 1:
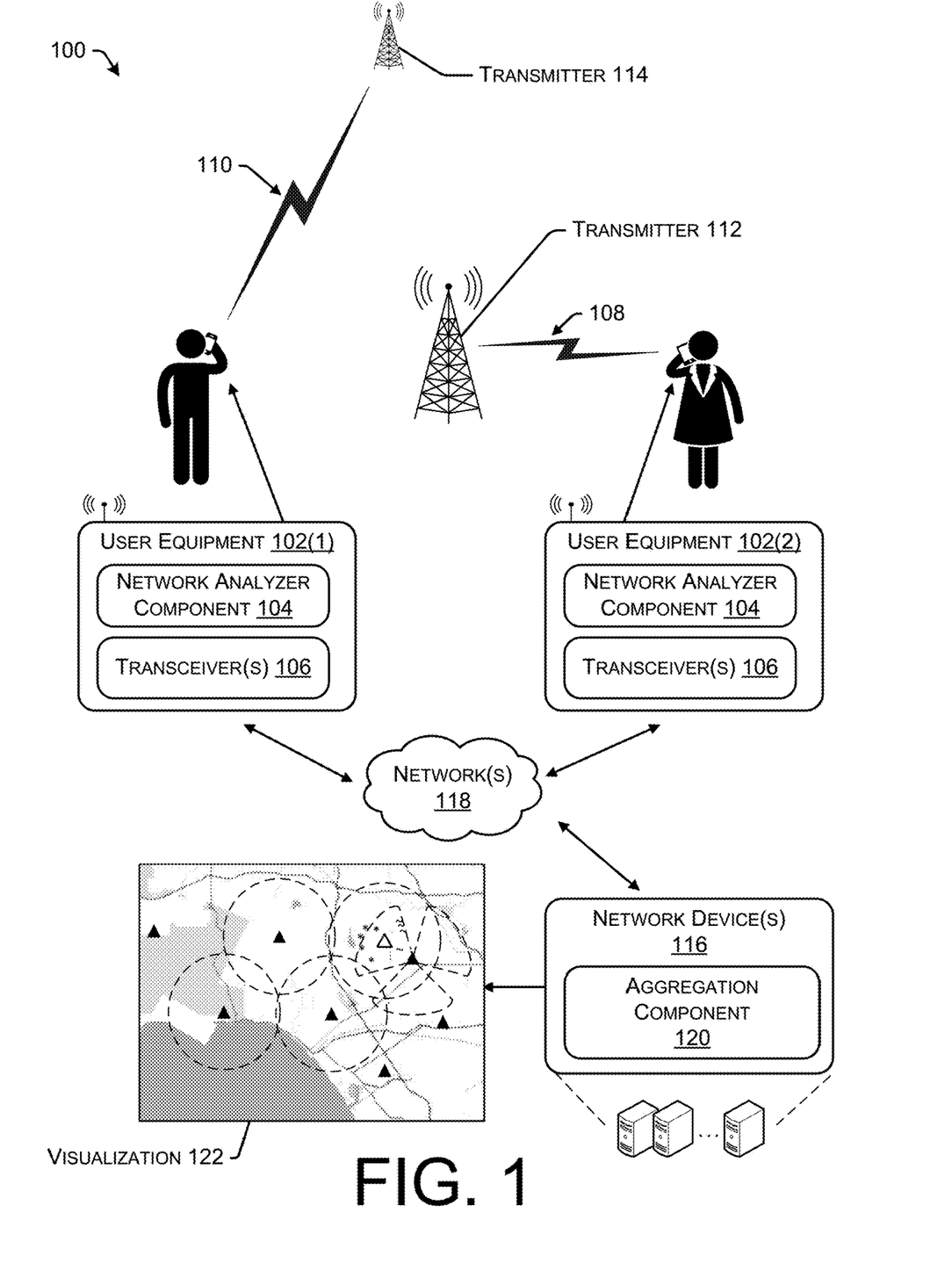
FIG. 1 illustrates an example environment including user equipment including a network analyzer to facilitate mobile collection of network metrics for overshooting analysis, as described herein.

FIG. 1 illustrates an example environment 100 including user equipment including a network analyzer to facilitate mobile collection of network metrics for overshooting analysis, as described herein.

In some instances, user equipment 102(1) and user equipment 102(2) (collectively referred to as user equipment 102) can include a network analyzer component 104 and one or more transceiver(s) 106. In general, the user equipment 102(1) and the user equipment 102(2) can receive signals 108 and 110 output by transmitters 112 and 114 to determine one or more metrics associated with the signals 108 and 110. In some instances, the user equipment 102 can receive the signals 108 and 110 and analyze the signals 108 and 110, as discussed herein, independent of conducting any communications via the signals 108 and 110 and/or the transmitters 112 and 114. In some instances, the transmitters 112 and 114 can represent any one-directional or two-directional wireless communication transceiver.

In some instances, the one or more transceiver(s) 106 can receive the signal 108 and 110 at the user equipment 102, and the network analyzer component 104 can determine various metrics associated with the signal 108 and 110. For example, the one or more metrics can include, but are not limited to, one or more of a received signal strength indication (RSSI), a reference signal received power (RSRP), a reference signal received quality (RSRQ), and a signal-to-interference-plus-noise ratio (SINR). Further, the metrics can include a channel identifier (e.g., channel 1, 2, . . . , N (where N is an integer)) and/or an indication of a frequency associated with a channel (e.g., 617-622 MHz, 622-627 MHz, 627-632 MHz, . . . , 647-652 MHz, and the like). Of course, these frequencies are examples and other frequencies can be used depending on various implementations.

In some instances, the user equipment 102 can receive a plurality of signals, for example, by tuning one or more filters associated with the transceiver(s) 106, to isolate a specific frequency of a signal. Other techniques can be used to configure the user equipment 102 to receive a range of frequencies.

The user equipment 102 can communicate with one or more network device(s) 116 via one or more network(s) 118.

In some instances, the network device(s) 116 can include an aggregation component 120. The aggregation component 120 can receive one or more metrics from the user equipment 102, as well as other user equipment, and aggregate the metrics to generate visualization 122. In some instances, and as discussed herein, the visualization 122 can be used, at least in part, to determine locations of cells that are active and the estimated coverage, to determine locations where cell signals overlap, to determine locations where calls are not being served by a nearest cell, to determine locations where cell signal is associated with poor quality, to inform decisions regarding optimization of wireless transmissions, and the like. As can be understood, the aggregation component 120 is not limited to outputting the visualization 122, and any number of visualizations or data can be utilized, as discussed herein.

Examples of the user equipment 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 116 can be implemented as one or more communication servers to facilitate communications by and between the various devices in the environment 100. That is, the network device(s) 116 can represent any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 116 may implement GSM, UMTS, LTE/LTE Advanced, and/or NR telecommunications technologies. In some instances, the telecommunication technologies can be referred to generally as a radio access technology. Thus, a 5G network can represent a 5G radio access technology. The network device(s) 116 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 116, and/or the network(s) 118. In some embodiments, the network device(s) 116 are operated by a service provider.

While FIG. 1 illustrates the network device(s) 116, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 118 can include, but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the user equipment 102 can communicate with any number of user equipment, servers, network devices, computing devices, and the like.

In the present example, the example environment 100 can illustrate an instance of overshooting. For example, both user equipment 102(1) and user equipment 102(2) are closer to transmitter 112 than transmitter 114, therefore both calls should be served by transmitter 112. However, in this example instance of overshooting, user equipment 102(1) is being served by the further out transmitter 114. In some instances, the signal 110 from transmitter 114 may be stronger than or equal to the signal 108 from transmitter 112 from where user equipment 102(1) is located. However, having two similarly strong signals overlap may result in signal noise and degrade the signal quality. This may result in a poorer user experience (e.g., noisy call) for the user of user equipment 102(1) relative to the user of user equipment 102(2).

Figure 2:
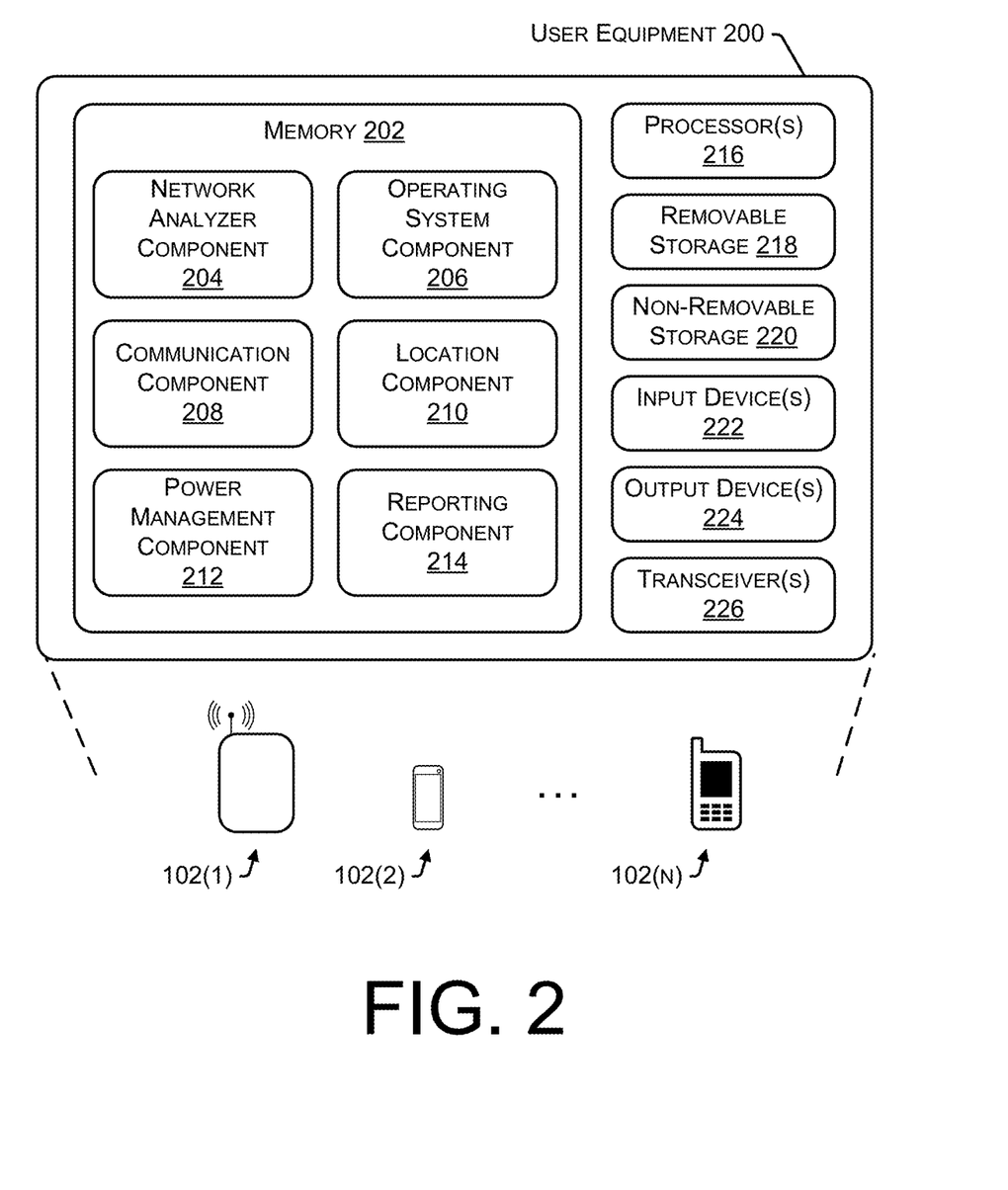
FIG. 2 illustrates an example user equipment configured to implement the network analyzer, in accordance with embodiments of the disclosure.

FIG. 2 illustrates an example user equipment 200 configured to implement the network analyzer, in accordance with embodiments of the disclosure. In some embodiments, the user equipment 200 can correspond to the user equipment 102 of FIG. 1. It is to be understood in the context of this disclosure that the user equipment 200 can be implemented as a single device or as a plurality of devices with components and data distributed among them. By way of example, and without limitation, the user equipment 200 can be implemented as various user equipment 102(1), 102(2), . . . , 102(N).

As illustrated, the user equipment 200 comprises a memory 202 storing a network analyzer component 204, an operating system component 206, a communication component 208, a location component 210, a power management component 212, and a reporting component 214. Also, the user equipment 200 includes processor(s) 216, a removable storage 218 and non-removable storage 220, input device(s) 222, output device(s) 224, and transceiver(s) 226.

In various embodiments, memory 202 is volatile (such as RAM), non-volatile (such as ROM, flash memory, etc.) or some combination of the two. The network analyzer component 204, the operating system component 206, the communication component 208, the location component 210, the power management component 212, and the reporting component 214 stored in the memory 202 can comprise methods, threads, processes, applications or any other sort of executable instructions. The network analyzer component 204, the operating system component 206, the communication component 208, the location component 210, the power management component 212, and the reporting component 214 can also include files and databases.

The network analyzer component 204 can include functionality to determine one or more metrics associated with a signal received, detected, or otherwise monitored by the user equipment 200. For example, the network analyzer component 204 can determine metrics including but not limited to RSSI, RSRP, RSRQ, SINR, power density and the like for a specific bandwidth in the frequency domain. The network analyzer component 204 can instruct the operating system component to control software and/or hardware associated with a transceiver of the user equipment to monitor conditions at the user equipment and to provide metrics (e.g., information about location, network environment, call status, etc.) indicative of the conditions to a network server for subsequent analysis. In some instances, information can be associated with the metrics, such as the geographical location of the user equipment (e.g., GPS or Wi-Fi based location), a cell identifier of a cell serving the user equipment, a signal-to-interference-plus-noise ratio (SINR), and the like. In some instances, the information may refer to geolocation information, which may include any information associated with the location, such as an address, the location latitude, the location longitude, the location accuracy, the location altitude, the location identifier, the location area code, and the like. The network analyzer component 204 can send the metrics to a network device to aggregate and analyze the metrics.

In some instances, the network analyzer component 204 can scan a frequency resource at any regular or irregular interval or can initiate a scan based on an internal or external trigger or command. For example, the network analyzer component 204 can receive an instruction from the remote network device to initiate a scan. In some instances, the network analyzer component 204 can determine operating conditions or characteristics of the user equipment 200 (e.g., a power resource, location, etc.), and a command to initiate scanning can be based at least in part on those operating conditions or characteristics.

In some instances, the network analyzer component 204 can be implemented as an application operating on the user equipment 200. In some instances, to initiate a scan of one or more frequency resources, the network analyzer component can call an API (application programming interface) implemented in the operating system component 206, for example.

In some instances, the network analyzer component 204 can include functionality to present a user interface on the user equipment 200, for example, to receive an indication from a user enabling or disabling a network analyzer mode of the network analyzer component 204. For example, in some instances, a user of the user equipment can turn on or turn off the network analyzer component 204 based on personal preferences, incentives from a service provider, inclusion in a voluntary program, and the like.

In some instances, the network analyzer component 204 can correspond to the network analyzer component 104 of FIG. 1.

The operating system component 206 can include functionality to query a chipset of the user equipment 200, and/or to query the transceiver(s) 226, to instruct the transceiver(s) 226 and/or any software or hardware to scan one or more channels or frequency resources to determine metrics associated with the channel or frequency resources, for example. In some instances, the operating system component 206 can include a first API to receive instructions from the network analyzer component 204 and to provide data to the network analyzer component 204, and a second API to issue instructions to software or hardware associated with a modem or the transceiver(s) 226 and to receive data from such components.

The communication component 208 can include functionality to conduct communications with one or more other devices, as discussed herein. In some instances, the communication component 208 can conduct a communication via a first set of frequency resources associated with a roaming network, while the network analyzer component 204 can scan a second set of frequency resources for a signal. In some instances, the communication component 208 can take priority over resources of the user equipment 200 to conduct a communication. That is, if the network analyzer component 204 initiates a scan of a frequency resource, and if the communication component 208 subsequently initiates a communication using the frequency resource or another frequency resource, in some instances, the communication component 208 can initiate the communication by interrupting the network analyzer component 204. In some instances, other prioritization schemes may be used, and the communication component 208 can have any relative or absolute priority level.

The location component 210 can include functionality to determine a location of the user equipment 200. In some instances, the location component 210 can determine a location based at least in part on GPS location data, base station identity, Wi-Fi access point identity (Wi-Fi location), or a combination of location sources. In some embodiments, a location can include a mobile network code (MNC) and a mobile country code (MCC) used in combination to uniquely identify a mobile network carrier network. In some embodiments, the location component 210 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 210 can determine a location of the user equipment 200 relative to a location of a geofenced location. For example, the location component 210 can receive a geofenced location from a network device.

The power management component 212 can include functionality to determine a status and/or level of a power resource of the user equipment 200. For example, the power management component 212 can determine a remaining battery percentage, remaining charge, used charge, etc. to evaluate resources of the user equipment 200. Further, the power management component 212 can determine that the power resource is above or below a threshold value, for example, to determine whether the remaining amount of energy is sufficient for expected levels of activity. In some instances, a schedule for initiating scanning of frequency resources can be based at least in part on a power resource of the user equipment 200. For example, when a battery level is relatively high (and/or the user equipment 200 is connected to an external source of power) the scanning can be initiated more frequently than when a battery level is relatively low (and/or the user equipment is not connected to external power). Of course, a variety of power management schemes can be used to initiate scanning based at least in part on available power resources.

The reporting component 214 can include functionality to store one or more metrics associated with one or more frequency resources and to send such metrics to a network device. In some instances, the reporting component 214 can send the one or more metrics to a network device as the one or more metrics are generated, captured, or determined. In some instances, the reporting component 214 can aggregate the metrics and send the aggregated metrics to the network device. In some instances, the reporting component 214 can send the metrics at a time of low network congestion (e.g., at night). In some instances, the reporting component 214 can transmit metrics in response to a query from a network device. In some instances, the reporting component 214 can encode the data sent to a network device such that a service provider tracking data usage does not count the data against a quota associated with the user equipment 200.

In some embodiments, the processor(s) 216 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. Memory 202, removable storage 218 and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

In various embodiments, the user equipment 200 can include applications including but are not limited, a web browser application, a video streaming application, an online gaming application, a network analyzer, and the like. During execution on the user equipment 102, each of the applications may be configured to cause the user equipment 102 to initiate data communications with the network device(s) 116 over the network(s) 118.

The user equipment 102 may be configured to communicate over a telecommunications network using any common wireless and/or wired network access technology. Moreover, the user equipment 102 may be configured to run any compatible device operating system (OS), including but not limited to, Microsoft Windows Mobile, Google Android, Apple iOS, Linux Mobile, as well as any other common mobile device OS.

The user equipment 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the user equipment 200 also includes one or more wired or wireless transceiver(s) 226. For example, the transceiver(s) 226 can include a network interface card (NIC), a network adapter, a LAN adapter, or a physical, virtual, or logical address to connect to various network(s) 118, or to the network device(s) 116, for example. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMax, Bluetooth, infrared communication, and the like.

In some instances, the transceiver(s) 226 can correspond to the transceiver(s) 106 of FIG. 1.

Figure 3:
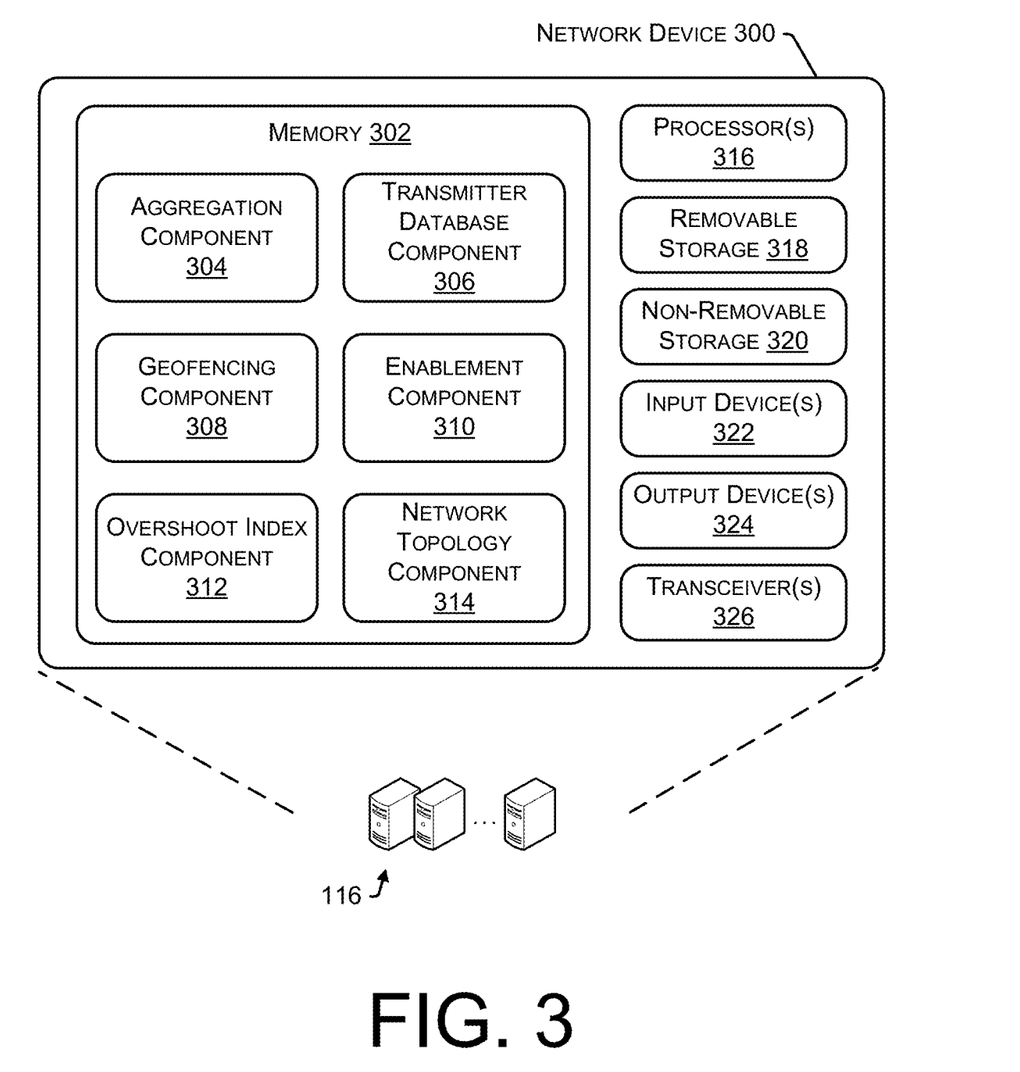
FIG. 3 illustrates an example network device configured to receive network metrics captured by user equipment, in accordance with embodiments of the disclosure.

FIG. 3 illustrates an example network device 300 configured to receive network metrics captured by user equipment, in accordance with embodiments of the disclosure. In some embodiments, the network device 300 can correspond to the network device 116 of FIG. 1. It is to be understood in the context of this disclosure that the network device 300 can be implemented as a single device or as a plurality of devices with components and data distributed among them.

As illustrated, the network device 300 comprises a memory 302 storing an aggregation component 304, a transmitter database component 306, a geofencing component 308, an enablement component 310, an overshoot index component 312, and a network topology component 314. Also, the network device 300 includes processor(s) 316, a removable storage 318 and non-removable storage 320, input device(s) 322, output device(s) 324, and transceiver(s) 326.

In various embodiments, the memory 302 is volatile (such as RAM), non-volatile (such as ROM, flash memory, etc.) or some combination of the two. The aggregation component 304, the transmitter database component 306, the geofencing component 308, the enablement component 310, the overshoot index component 312, and the network topology component 314 stored in the memory 302 can comprise methods, threads, processes, applications or any other sort of executable instructions. The aggregation component 304, the transmitter database component 306, the geofencing component 308 the enablement component 310, the overshoot index component 312, and the network topology component 314 can also include files and databases.

The aggregation component 304 can include functionality to receive one or more metrics determined and/or captured by user equipment, as discussed herein. In some instances, the aggregation component 304 can receive a plurality of metrics and store the metrics in a database. In some instances, the metrics can be indexed by location, time, serving cell ID, user equipment, and the like. In some instances, the aggregation component 304 can perform any statistical analysis on the metrics to determine a variety of signal characteristics. For example, the aggregation component 304 can determine a signal type (e.g., TV, radio, cell phone, etc.) as well as quantitate or qualitative characteristics of the signal.

In some instances, the aggregation component 304 can correspond to the aggregation component 120 of FIG. 1.

The transmitter database component 306 can store identifiers and locations of cells, which may be referred to as transmitters and/or base stations, in a database. The transmitter database component 306 can assign a new cell a cell identifier (may be referred to as a based station identifier) and the cell identifier may be any uniquely assigned identification code or number assigned to a cell for the transmitter database component 306 to identify the exact cell and may be used to further identify the location of the cell based on information stored on a lookup table or database. The transmitter database component 306 can also store information related to each cell, including the number of antennas, the transmission level of each antenna, the direction of each antenna, in the database. Further, the transmitter database component 306 can receive location data, cell ID, and/or metrics associated with a signal to determine which transmitter corresponds to the metrics. In some instances, the transmitter database component 306 can determine a confidence value associated with the identity of a transmitter or base station.

The geofencing component 308 can include functionality to determine areas in which the overshooting analysis should be performed. For example, the geofencing component 308 can determine network coverage area, or sector, with multiple cells where metrics are to be determined. Additionally, the geofencing component 308 can determine areas (e.g., location range) around a cell where metrics are to be determined. In some instances, the geofencing component 308 can determine areas where network resources (e.g., base stations) are to be adjusted (e.g., reduced or increased transmission power) to confirm adjusted signal in that area. In some instances, the geofencing component 308 can send indications of the geofenced locations to one or more user equipment to collect metrics, as discussed herein.

The enablement component 310 can include functionality to enable a network analyzer component for individual user equipment. For example, the enablement component 310 can send invitations to various user equipment to determine if users of the user equipment wish to activate the network analyzer, as discussed herein. In some instances, the enablement component 310 can enable the network analyzer component for individual user equipment based at least in part on characteristics of the user component, such as whether an antenna of the user equipment is configured to receive signals associated with particular frequency resources.

In further examples, the enablement component 310 can provide an instruction or indication to conduct drive-testing in an area based at least in part on metrics obtained by user equipment, as discussed herein.

The overshoot index component 312 can interact with the aggregation component 304 and include functionality to analyze the aggregated metrics to determining the overshoot index for each network cell, as discussed herein. The aggregation component 304 can aggregate metrics at the network server to determine, for a number of user devices residing in a coverage area associated with a cell, whether those user devices are served by the cell or by a neighboring cell. The techniques include determining instances where the serving network cell was not the closest cell to the user equipment when the call was made. In some instances, the aggregated metrics can be indexed by cell identifier (may also be referred to as "base station identifier"), the location area, the number of calls served by the network cell in the area, the total number of calls served in the area, and the like.

In further examples, the overshoot index component 312 can determine the overshoot index based on a first number of calls served by a particular cell but that particular cell is not the closest cell to the user equipment and a second number of total calls served by that particular cell. Further, the overshoot index component 312 can used the first number of calls and the second number of total calls to determine a percentage of instances where a particular cell is the serving cell, but not the closest cell to the user equipment. This percentage may then be compared to a threshold to determine whether the particular cell is an overshooter. If the percentage is below the threshold, the particular cell may have instances of overshooting but is not designated an overshooter cell.

For example, at Location One, a Network Cell A served 200 calls, where 170 calls served were instances where Network Cell A is the closest cell and 22 calls served were instances where Network Cell A is NOT the closest cell, the overshoot index for Network Cell A would be 11%. Also, at Location A, a Network Cell B served 300 calls, where 18 calls served were instances where Network Cell B is the closest cell and 282 calls served were instances where Network Cell B is NOT the closest cell, the overshoot index for Network Cell B would be 94%. Relative to cells at Location One, the overshoot index for Network Cell B would be considered "high," while the overshoot index for Network Cell A would be considered "low." Accordingly, Network Cell A can be considered not to be an overshooter, while Network Cell B can be designated as an overshooter. In some instances, such "high" and "low" can be considered to be relative terms and/or can be considered with respect to a threshold value. For instance, the threshold may be 40%, and an overshoot index that is equal to 40% or lower may be "low," while an overshoot index above 40% may be "high." Although the overshoot index is expressed at a percentage here, it can be any numeric expression, including fraction or decimal.

In some instances, overshoot index component 312 can perform any statistical analysis on the metrics and/or overshoot index to evaluate overshooting within an area and to determine if the amount of signal interference is degrading user experience and/or to adjust a transmission power of an overshooting cell to reduce interference and to ensure balanced implementation of network topologies. In additional examples, the overshoot index component 312 may determine the threshold value for the overshoot index based partly on the signal-to-interference-plus-noise ratio (SINR). In some instances, the overshoot index component 312 can generate reports based on the statistical analysis to present evaluation results and provide recommendations. In examples, the overshoot index component 312 can generate recommendations to decrease coverage for areas with a high overshoot index, which may include changing a direction of one or more antennas and/or adjusting transmission power to decrease coverage, as discussed herein. The changing of an antenna direction can be referred to as a "tilt" and may include rotating the antenna to change the direction of broadcast for the antenna or tilting the antenna to change the angle of the antenna with respect to a ground. The change of antenna direction needed for an overshooter cell may be determined based on the location of the overshooter cell relative to a neighboring cell that is trespassed upon most frequenting in the overshooting count. A recommendation to adjust transmission power may include the level of change based on the overshoot index. In additional examples, the overshoot index component 312 may determine to adjust the two or more cells at the same time. In some examples, the overshoot index component 312 may determine the adjustment based on a relative number of calls supported by each base station. For instance, if an area is particularly dense with based stations, the overshoot index component 312 may determine to adjust the power of Cell A to 80% of standard power level and power of Cell B to 90% of standard power level. In the present example, the overshoot index component 312 may also increase the power level or adjust one or more antennas at each of the cells.

In various examples, the overshoot index component 312 can send messages, based on the overshoot index, to a computer device at an offending cell to automatically adjust the coverage. In additional examples, the overshoot index component 312 can continuously monitor the network metrics related to the offending cell to determine if additional adjustment is needed including increasing or decreasing transmission power. The overshoot index component 312 can send additional messages, based on determining over or under correcting the coverage, to the computer device at the offending cell again to automatically adjust the coverage. For instance, if decreasing transmission power an offending cell causes an increase number of dropped calls or if any of the neighboring cells are constantly at or near maximum capacity, the overshoot index component 312 may determine to increase the power of the overshooter cell by some predetermined level of power or percentage of power.

In additional examples, the overshoot index component 312 may determine to temporarily increase the power of former overshooter cells during specific time interval when a larger than usual influx of user is expected (e.g., for cells near a stadium during a ball game, cells along the path of a planned parade, etc.). In additional examples, the overshoot index component 312 may learn patterns of increased user for particular time frame in a particular area based on continuously monitoring the network metrics and may temporarily increase the power cells in response to the learned patterns. For instance, an overshooter base station may be instructed to decrease the power of antenna 1 to 50% of max power, but during a weekly ballgame on Sunday at 4, increase power of the antenna 1 up to 90% for 5 hours.

Figure 5:
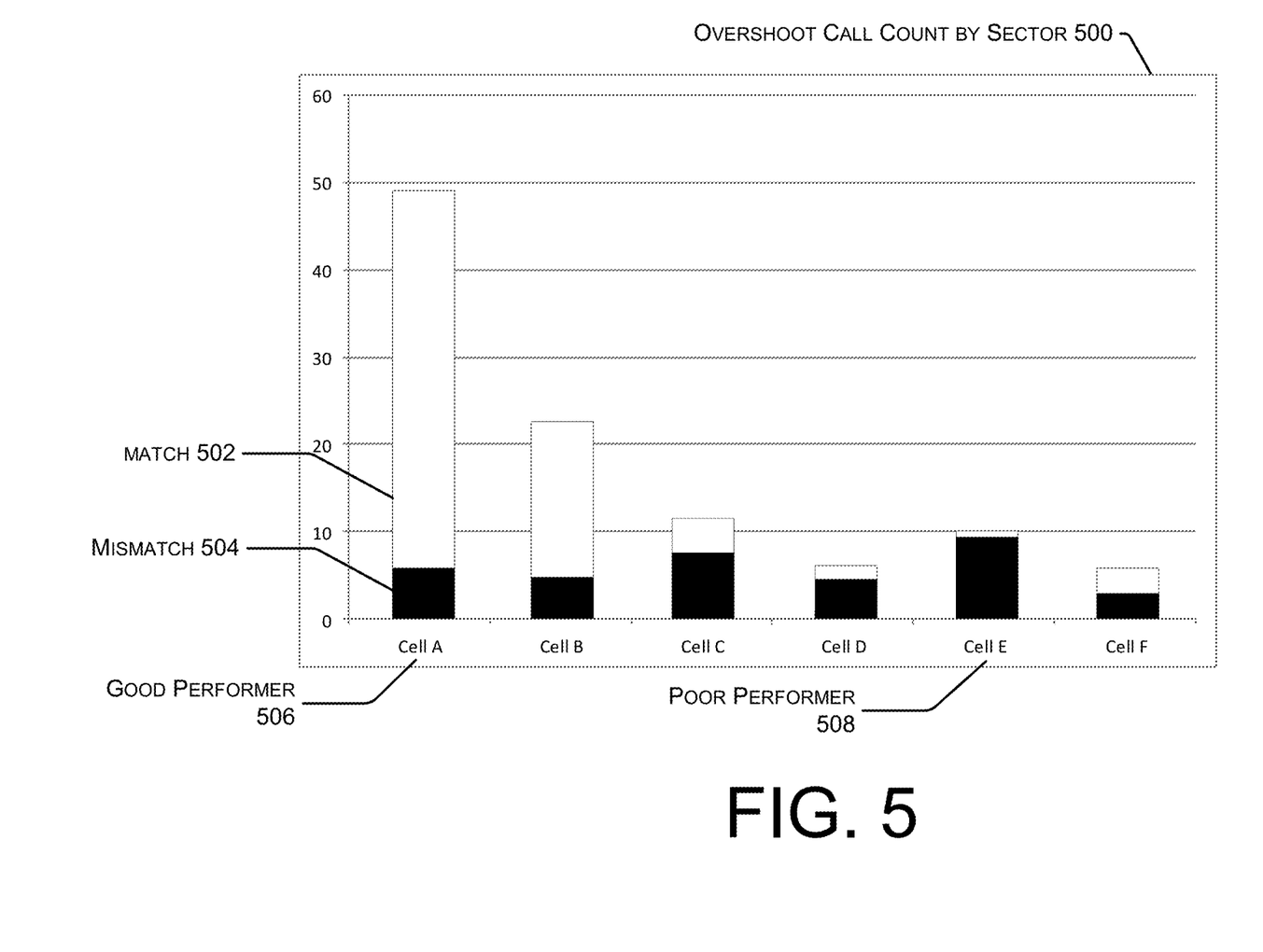
FIG. 5 illustrates an example graph for overshooting analysis based on network metrics captured using a network analyzer, as discussed herein.

In some instances, the overshoot index component 312 can perform overshooting analysis for network cells within a location area or sector as described herein with respect to FIG. 5.

The network topology component 314 can include functionality to determine the estimated coverage by network cell for a location area or sector, as discussed herein. In some instances, the network topology component 314 can determine the number of calls served by the cells within a sector. Each sector may include multiple cells. The network topology component 314 can determine the coverage range for each of the multiple cells. The network topology component 314 can determine a first number of calls from user equipment served by the closest cell and a second number of calls from user equipment NOT served by the closest cell.

In various examples, the network topology component 314 can generate a network coverage map to provide visualization of the potential interference and overshooting. The network topology component 314 can provide a visual network mapping of the cells, each cell's coverage area, the calls served by the closest cell, and/or the calls NOT served by the closest cell to highlight areas with potential overshooting issues. In additional examples, the network topology component 314 can provide a user interface to view and interact with a coverage map, as described herein with respect to FIG. 4. In various examples, the user interface can allow network engineers or service personnel to select a cell to simulate tuning components to increase or decrease coverage for an area. The simulated components tuning may include changing antenna orientation(s), adjusting power levels, and/or adding additional base stations to tune coverage, as discussed herein. Based on the simulated change, the network topology component 314 can provide a recommended setting and/or generate a recommended setting report to increase or decrease coverage for the selected cell, which may include specific machine setting to change the antenna direction and/or a level of change to transmission power.

Figure 4:
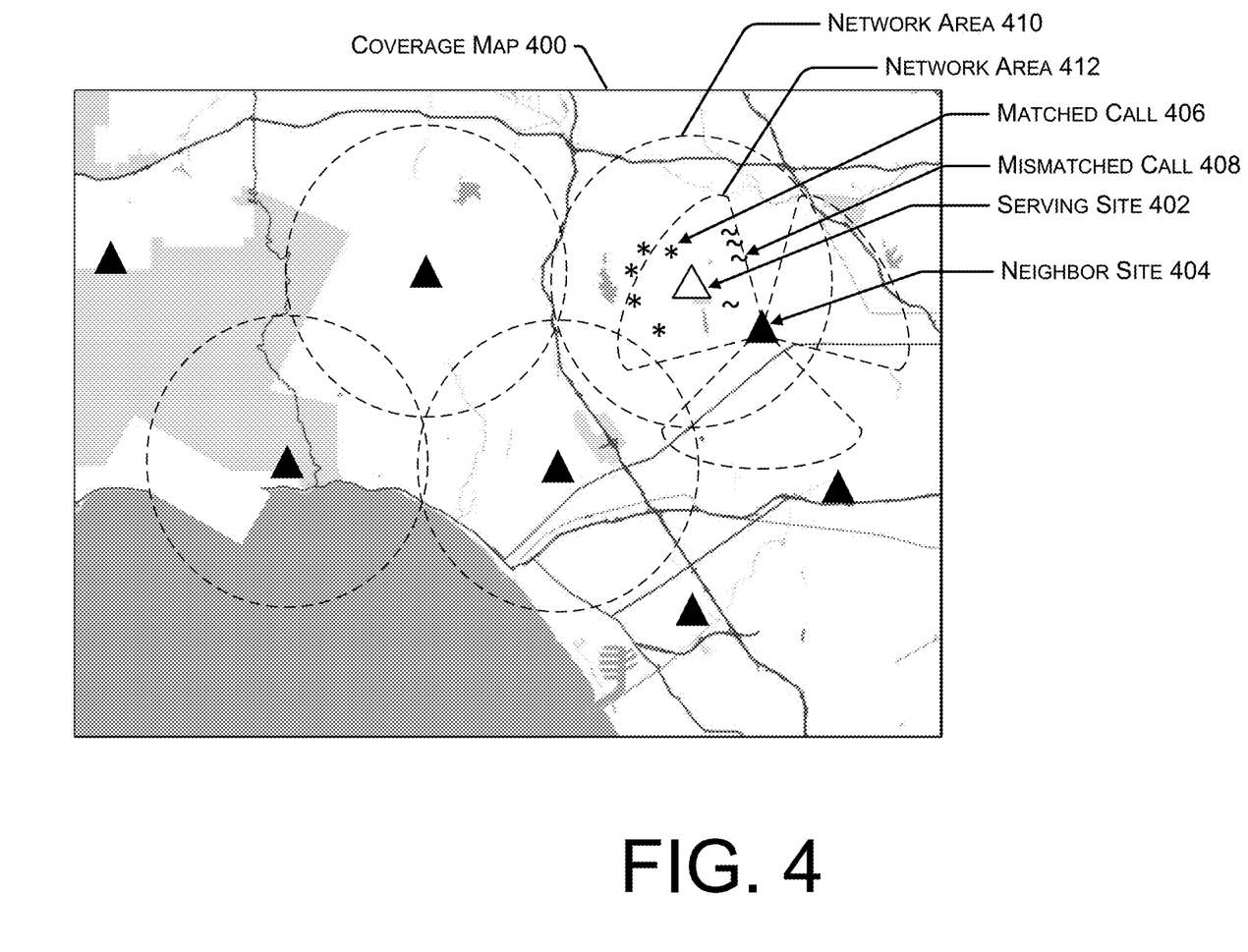
FIG. 4 illustrates an example visualization of network data including data captured using a network analyzer, as discussed herein.

In some instances, the network topology component 314 can generate visualization for network coverage map as described herein with respect to FIG. 4.

In some embodiments, the processor(s) 316 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and nonvolatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the network device 300. Any such tangible computer-readable media can be part of the network device 300.

The network device 300 can include input device(s) 322, such as a keypad, a cursor control, a touch-sensitive display, etc. Also, the network device 300 can include output device(s) 324, such as a display, speakers, etc. These devices are well known in the art and need not be discussed at length here.

As illustrated in FIG. 3, the network device 300 can include one or more wired or wireless transceiver(s) 326. In some wireless embodiments, to increase throughput, the transceiver(s) 326 can utilize multiple-input/multiple-output (MIMO) technology. The transceiver(s) 326 can be any sort of wireless transceivers capable of engaging in wireless, radio frequency (RF) communication. The transceiver(s) 326 can also include other wireless modems, such as a modem for engaging in Wi-Fi, WiMax, Bluetooth, infrared communication, or the like.

FIG. 4 illustrates an example visualization of network data including data captured using a network analyzer, as discussed herein. In some instances, the example visualization can be represented as a coverage map 400.

In some instances, the coverage map 400 can represent various transmitters including serving site 402 and neighbor site 404 in an environment. Further, the coverage map 400 can represent various data captured by calls including matched call 406 and mismatched call 408, which can correspond to aggregated data and/or individual metrics collected by user equipment, as discussed herein. In some instances, the matched call 406 and mismatched call 408 can capture different metrics, such as RSSI, RSRP, RSRQ, or SINR, determined by the user equipment. The network metrics can include key metrics captured at the time of a communication and can include: the geographical location (e.g., GPS or Wi-Fi based location) of the user equipment (including latitude/longitude and location accuracy), a cell identifier of a cell serving the user equipment, and a signal-to-interference-plus-noise ratio (SINR).

In the present example, the calls represented by matched call 406 and mismatched call 408 should both be served by the nearest cell, which is serving site 402. The serving site 402 may be a base station with an omnidirectional antenna and is broadcasting in network area 410. The neighbor site 404 may be a base station with three antennas and a first antenna may be broadcasting in network area 412. The user equipment connected to the nearest cell can be represented as the matched call 406, corresponding to the symbol "*". In some examples, the user equipment not connected to the nearest cell, can be represented as the mismatched call 408, corresponding to the symbol "~". Of course, any indications (e.g., color, size, shape, labels, etc.) can be used to distinguish between various metrics.

In some examples, the coverage map 400 can be used in part to determine locations where active transmitters (e.g., the serving site 402 or neighbor site 404) are located, where the coverage range for the transmitters are (e.g., the network area 410 or 412), and the like, and/or where the coverage overlap, for example. In various examples, the coverage map 400 can simulate components tuning including changing antenna orientation(s), adjusting power levels, and/or adding additional base stations to tune coverage, as discussed herein. For instance, the neighbor site 404 may be designated as an overshooter cell, and based on the direction of the neighbor site 404 relative to the serving site 402, the first antenna that is broadcasting network area 412 may be tuned. For example, the power level of the first antenna may be decreased by 50%. The coverage map 400 may simulate this change in power and determine a new predicted overshoot index for the neighbor site 404 based on this change. The simulated adjustments may allow an engineer to further tune or otherwise adjust the components, or may be accepted to generate messages to send to the base stations to perform the tuning.

In some instances, the coverage map 400 can be generated by the network topology components 314, as discussed herein. Of course, the example visualizations are not limited to the coverage map 400. Further, the serving site 402 or neighbor site 404 are not limited to transmitters and include any transceivers and/or base stations.

FIG. 5 illustrates an example graph for overshooting analysis based on network metrics captured using a network analyzer, as discussed herein. In some instances, the example visualization can be represented as an overshoot call count by sector 500.

In some instances, the overshoot call count by sector 500 can represent overshooting analysis of a number of cells serving a particular sector and the calls served by each cell. For example, the calls served by each cell may be represented as match 502 and mismatch 504 in the graph. The calls being served correctly by nearest cell may be indicated by the white bar graph (e.g., match 502). The calls being served NOT by nearest cell may be indicated by the black bar graph (e.g., mismatch 504). The cells represented by bar graphs having more correctly matched calls represented by a higher proportion of white bar to black bar (e.g., good performer 506) may indicate the cell is not an overshooter. The cells represented by bar graphs having more mismatched calls represented by a higher proportion of black bar to white bar (e.g., poor performer 508) may indicate that the cell is an overshooter.

In some instances, the overshoot call count by sector 500 can be generated by the overshoot index component 312, as discussed herein. Of course, the example visualizations are not limited to overshoot call count by sector 500.

Figure 6:
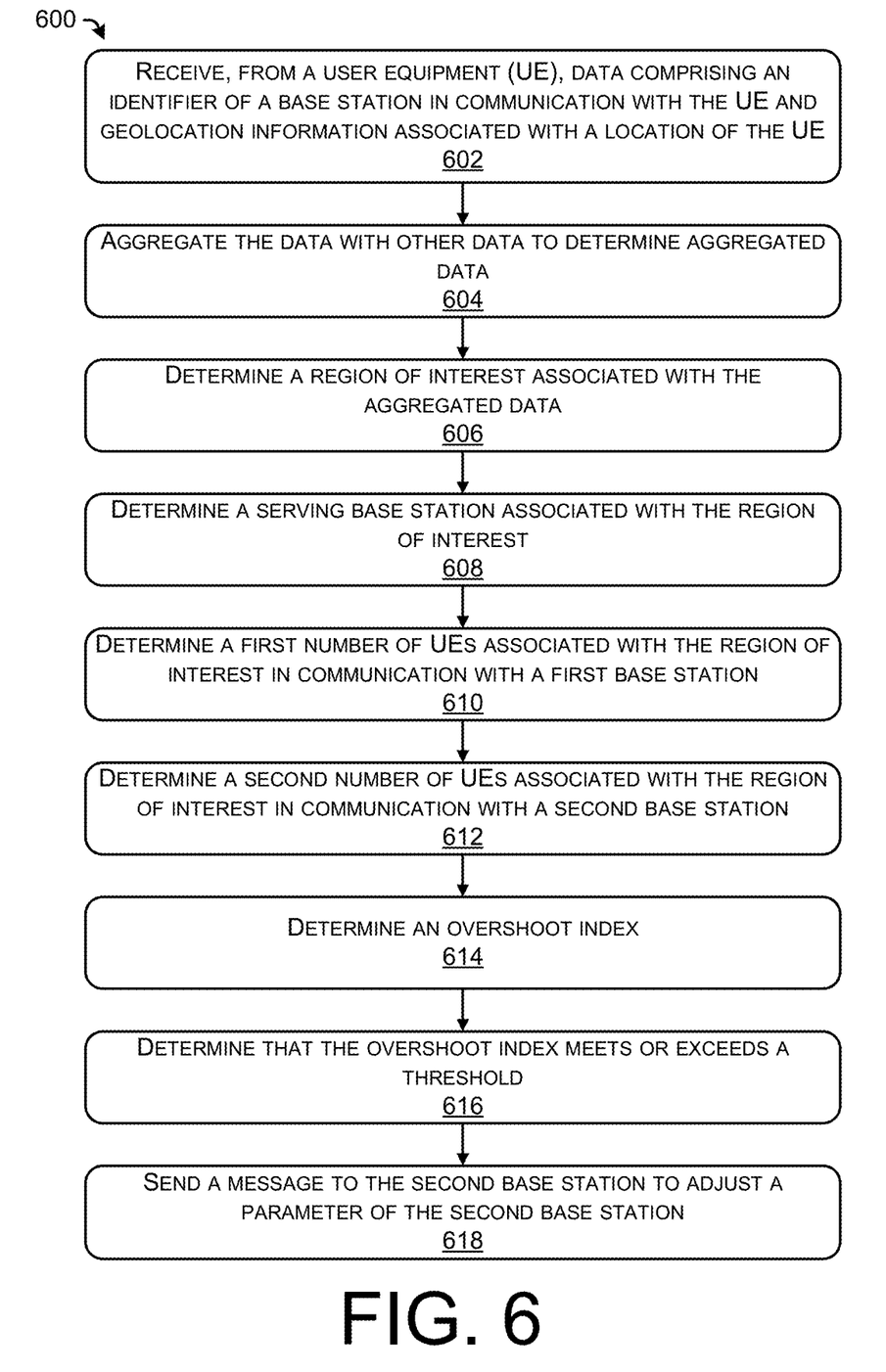
FIG. 6 illustrates an example process for receiving network metrics and determining the overshooting index based on aggregated network metrics, as described herein.
Figure 7:
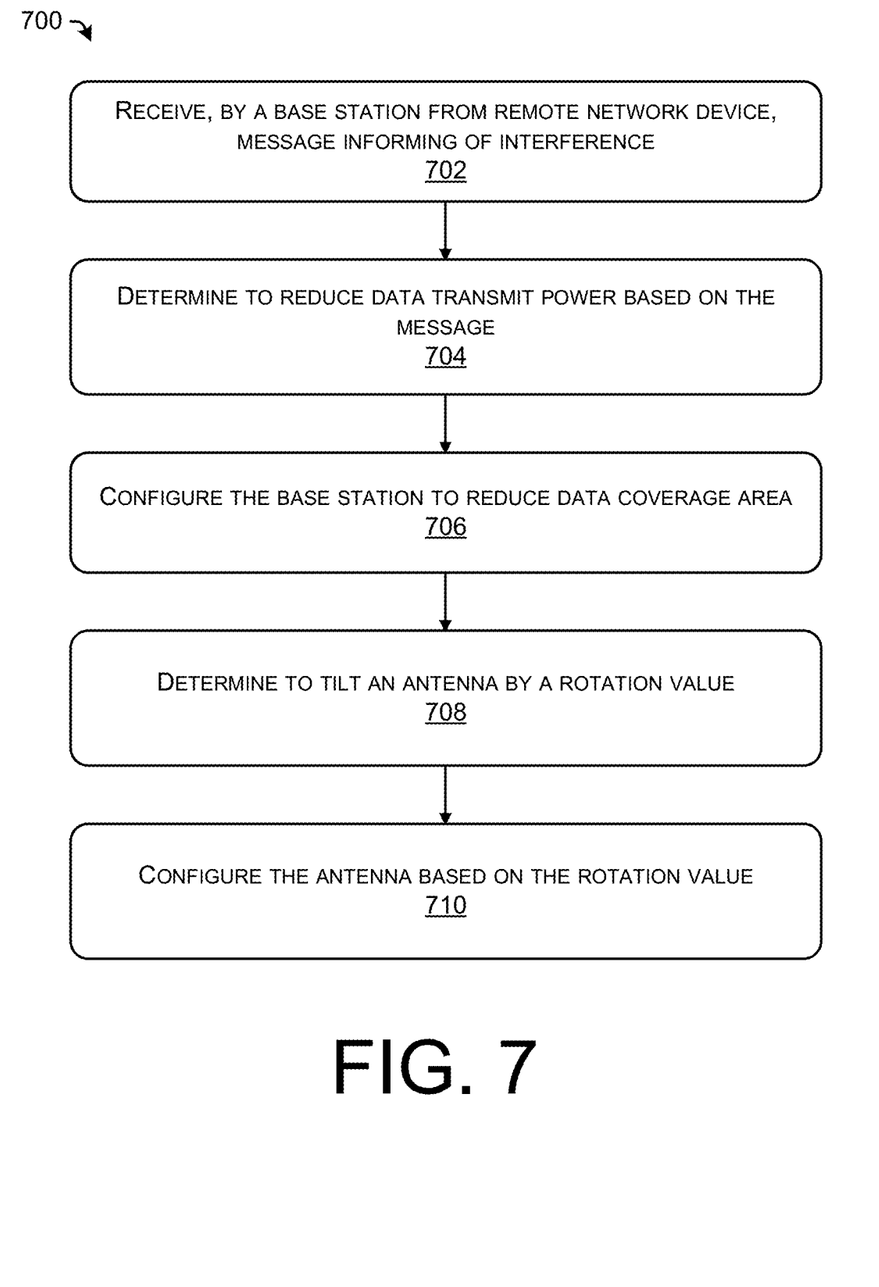
FIG. 7 illustrates an example process for instructing components of a network device at a base station to adjust a base station setting, as described herein.

FIGS. 6 and 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process 600 for receiving network metrics and determining the overshooting index based on aggregated network metrics, as described herein. The example process 600 can be performed by the network device(s) 116 and 300 (or another component), in connection with the user equipment 102 and 200 (or another component), and other components discussed herein. Some or all of the process 600 can be performed by one or more devices, equipment, or components illustrated in FIGS. 1-3, for example.

At operation 602, the process can include receiving, from a user equipment (UE), data comprising an identifier of a base station in communication with the UE and geolocation information associated with a location of the UE. In some instances, the operation 602 can be performed by the user equipment using the network analyzer component 104 or 204, for example. In some instances, the operation 602 can include one or more metrics associated with a signal received, detected, or otherwise monitored by the user equipment 200. For example, the network analyzer component 204 can determine metrics including but not limited to RSSI, RSRP, RSRQ, SINR, power density and the like for a specific bandwidth in the frequency domain. The network analyzer component 204 can instruct the operating system component to control software and/or hardware associated with a transceiver of the user equipment to monitor conditions at the user equipment and to provide metrics (e.g., information about location, network environment, call status, etc.) indicative of the conditions to a network server for subsequent analysis. In some instances, information can be associated with the metrics, such as the geographical location of the user equipment (e.g., GPS or Wi-Fi based location), a cell identifier of a cell serving the user equipment, a signal-to-interference-plus-noise ratio (SINR), and the like. In some instances, the information may refer to geolocation information, which may include any information associated with the location, such as an address, the location latitude, the location longitude, the location accuracy, the location altitude, the location identifier, the location area code, the GPS location (coordinates determined by GPS sensor), the Wi-Fi location (coordinates determined by Wi-Fi location service), and the like. The network analyzer component 204 can send the metrics to a network device to aggregate and analyze the metrics.

At operation 604, the process can include aggregating the data with other data to determine aggregated data. As discussed herein, the user equipment can monitor conditions at the user equipment and provides metrics (e.g., information about location, network environment, call status, etc.) indicative of the conditions to a network server for subsequent analysis. In some instances, the operation 604 can include functionality to receive one or more metrics determined and/or captured by user equipment, as discussed herein. In some instances, the operation 604 can receive a plurality of metrics and store the metrics in a database. In some instances, the metrics can be indexed by location, time, serving cell ID, user equipment, and the like. In some instances, the operation 604 can perform any statistical analysis on the metrics to determine a variety of signal characteristics. For example, the operation 604 can determine a signal type (e.g., TV, radio, cell phone, etc.) as well as quantitate or qualitative characteristics of the signal.

At operation 606, the process can include determining a region of interest associated with the aggregated data. The operation 606 can include functionality to determine areas in which the overshooting analysis should be performed. For example, the operation 606 can determine network coverage area, or sector, with multiple cells where metrics are to be determined. Additionally, the operation 606 can determine region of interest based on the broadcast area (e.g., location range) around a cell (e.g., the overshooter cell, the neighboring cell, the trespassed upon cell) where metrics are to be determined. In some instances, the operation 606 can determine areas where network resources (e.g., base stations) are to be adjusted (e.g., reduced transmission power) to confirm adjusted signal in that area.

At operation 608, the process can include determining a serving base station associated with the region of interest. For example, the operation 608 can include functionality to determine base station within a location area, as discussed herein. The operation 608 can store locations of cells, which may be referred to as transmitters and/or base stations, in a database. The operation 608 can also store information related to each cell, including the number of antennas, the transmission level of each antenna, the direction of each antenna, in the database. Further, the operation 608 can receive location data, cell ID, and/or metrics associated with a signal to determine which transmitter corresponds to the metrics. In some instances, the operation 608 can determine a confidence value associated with the identity of a transmitter or base station.

At operation 610, the process can include determining, based at least in part on the aggregated data, a first number of UEs associated with the region of interest in communication with a first base station. The operation 610 can receive location data, cell ID, and/or metrics associated with a signal to determine which transmitter corresponds to the metrics. In some instances, the operation 610 can determine a confidence value associated with the identity of a transmitter or base station. Based on identifying the first base station, operation 610 can ping the first base station for a count of the number of UEs that it is communicatively connected to.

At operation 612, the process can include determining, based at least in part on the aggregated data, a second number of UEs associated with the region of interest in communication with a second base station. The operation 612 can determine a confidence value associated with the identity of a transmitter or base station. Based on identifying the second base station, operation 612 can ping the second base station for a count of the number of UEs that it is communicatively connected to.

At operation 614, the process can include determining an overshoot index. For example, the operation 614 can determine the overshoot index based at least in part on the first number of UEs in communication with the first base station and the second number of UEs in communication with the second base station, wherein the overshoot index represents a number of communications not served by the serving base station in the region of interest. The operation 614 can determine the overshoot index based on a first number of calls served by a particular cell but that particular cell is not the closest cell to the user equipment and a second number of total calls served by that particular cell. Further, the operation 614 can used the first number of calls and the second number of total calls to determine a percentage of instances where a particular cell is the serving cell, but not the closest cell to the user equipment. This percentage may then be compared to a threshold to determine whether the particular cell is an overshooter.

At operation 616, the process can include determining, based at least in part on the aggregated data, a first number of UEs associated with the region of interest in communication with a first base station.

At operation 618, the process can include sending a message to the second base station to adjust a parameter of the second base station. For example, the operation 618 can include sending the overshoot index to the second base station based at least in part on the overshoot index meeting or exceeding the threshold, as discussed herein. In examples, the operation 618 can include recommendations to decrease coverage, which may include changing a direction of an antenna, and/or adjusting power, as discussed herein. The operation 618 can perform any statistical analysis on the metrics and/or overshoot index to evaluate overshooting within an area and to determine if the amount of signal interference is degrading user experience and/or to adjust a transmission power of an overshooting cell to reduce interference and to ensure balanced implementation of network topologies. In additional examples, the operation 618 may determine the threshold value for the overshoot index based partly on the signal-to-interference-plus-noise ratio (SINR). In some instances, the operation 618 can generate reports based on the statistical analysis to present evaluation results and provide recommendations. In examples, the operation 618 can generate recommendations to decrease coverage for areas with a high overshoot index, which may include changing a direction of an antenna and/or adjusting transmission power to decrease coverage, as discussed herein. The changing a direction of an antenna can be referred to as a "tilt" and may include rotating the antenna to change the direction of broadcast for the antenna or tilting the antenna to change the angle of the antenna with respect to a ground. The direction of adjustment needed for an overshooter cell may be determined based on the location of the overshooter cell relative to a neighboring cell that is trespassed upon most frequenting in the overshooting count. A recommendation to adjust transmission power may include the level of change based on the overshoot index FIG. 7 illustrates an example process 700 for instructing components of a network device at a base station to adjust a base station setting, as described herein. The example process 700 can be performed by the network device(s) 116 and 300 (or another component), in connection with the user equipment 102 and 200 (or another component), and other components discussed herein. Some or all of the process 700 can be performed by one or more devices, equipment, or components illustrated in FIGS. 1-3, for example.

At operation 702, the process can include receiving, by a base station from remote network device, message informing of interference. In some instances, the operation 702 can receive message include one or more metrics associated with a signal received or detected and/or call information from communication otherwise monitored by the user equipment 200. In some instances, the operation 702 can be performed by a remote network device using the overshoot index component 312, for example. The overshoot index component 312 can send messages, based on the overshoot index, to a computer device at an offending cell (e.g., the base station) to automatically adjust the coverage. In additional examples, the overshoot index component 312 can continuously monitor the network metrics related to the offending cell to determine if additional adjustment is needed including increasing or decreasing transmission power. The overshoot index component 312 can send additional messages, based on determining over or under correcting the coverage, to the computer device at the offending cell again to automatically adjust the coverage. For instance, if decreasing transmission power an offending cell causes an increase number of dropped calls or if any of the neighboring cells are constantly at or near maximum capacity, the overshoot index component 312 may determine to increase the power of the overshooter cell by some predetermined level of power or percentage of power.

At operation 704, the process can include determining to reduce data transmit power based on the message. In some instances, the operation 704 can receive specific instructions from the message indicating interference and the base station may determine a level of power to reduce the transmission by. In some instances, the operation 704 can receive specific instructions from the message reduce the transmission power to a specific level or percentage level.

At operation 706, the process can include configuring the base station to reduce data coverage area. In some instances, the operation 706 can be performed by a network device at the base station to configure the level of transmission power.

At operation 708, the process can include determining to tilt an antenna by a rotation value. In some instances, the operation 704 can first determine to tilt the antenna toward a direction, then the operation 708 can determine the rotation value for the antenna in order to tilt the antenna toward a direction. The operation 704 may receive a general direction to reduce interference toward and may determine the actual direction to adjust the antenna toward.

At operation 710, the process can include configuring the antenna based the rotation value. In some instances, the operation 710 can configure the antenna to tilt based on the rotation value.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
      receiving, from a user equipment (UE), data comprising an identifier of a base station in communication with the UE and geolocation information associated with a location of the UE;
      aggregating the data with other data to determine aggregated data;
      determining a region of interest associated with the aggregated data;
      determining a serving base station associated with the region of interest;
      determining, based at least in part on the aggregated data, a first number of UEs associated with the region of interest in communication with a first base station, wherein the first base station is the serving base station;

determining, based at least in part on the aggregated data, a second number of UEs associated with the region of interest in communication with a second base station;

determining an overshoot index based at least in part on the first number of UEs in communication with the first base station and the second number of UEs in communication with the second base station, wherein the overshoot index represents a number of communications not served by the serving base station in the region of interest;

determining that the overshoot index meets or exceeds a threshold;

sending a message to the second base station to adjust a parameter of the second base station based at least in part on the overshoot index meeting or exceeding the threshold; and causing a user interface to render a network map identifying the first based station and the second base station based at least in part on the overshoot index.

2. The system of claim 1, wherein the parameter comprises a transmission power, and wherein the message comprises a command to decrease the transmission power of the second base station.

3. The system of claim 1, wherein the parameter comprises an antenna direction, and wherein the message comprises a command to change at least one of a tilt associated with an antenna of the second base station.

4. The system of claim 1, wherein the other data includes additional data received from at least one of additional UEs, additional base stations, or a database of base station information.

5. The system of claim 1, wherein the region of interest corresponds to a coverage area associated with the first base station.

6. The system of claim 1, wherein the first base station is associated with an omnidirectional antenna.

7. The system of claim 1, wherein the data further comprises signal-to-interference-plus-noise ratio (SINR) data observed by the UE at the location, the operations further comprising:

determining the overshoot index further based in part on the SINR data.

8. A method comprising:

receiving, from a user equipment (UE), data comprising an identifier of a base station in communication with the UE and geolocation information associated with a location of the UE;

aggregating the data with other data to determine aggregated data;

determining a region of interest associated with the aggregated data;

determining a serving base station associated with the region of interest;

determining, based at least in part on the aggregated data, a first number of UEs associated with the region of interest in communication with a first base station, wherein the first base station is the serving base station;

determining, based at least in part on the aggregated data, a second number of UEs associated with the region of interest in communication with a second base station; and determining an overshoot index based at least in part on the first number of UEs in communication with the first base station and the second number of UEs in communication with the second base station, wherein the overshoot index represents a number of communications not served by the serving base station in the region of interest; and causing a user interface to render a network map identifying the first based station and the second base station based at least in part on the overshoot index.

9. The method of claim 8, wherein the method further comprises:

determining that the overshoot index meets or exceeds a threshold; and generating a report to identify the second base station and the overshoot index.

10. The method of claim 8, wherein the method further comprises:

determining that the overshoot index meets or exceeds a threshold; and sending a message to the second base station to adjust a parameter of the second base station based at least in part on the overshoot index meeting or exceeding the threshold.

11. The method of claim 10, wherein the parameter comprises a transmission power, and wherein the message comprises a command to decrease the transmission power of the second base station.

12. The method of claim 10, wherein the parameter comprises an antenna direction, and wherein the message comprises a command to change a tilt associated with an antenna of the second base station.

13. The method of claim 8, wherein the data further comprises signal-to-interference-plus-noise ratio (SINR) data observed by the UE at the location, the method further comprising:

determining the overshoot index further based in part on the SINR data.

14. The method of claim 8, wherein the geolocation information includes at least one of a GPS location or a Wi-Fi location.

15. A method comprising:

receiving, by a base station from a remote network device, a message informing of signal interference including a direction and a magnitude of the signal interference, the base station including at least a first antenna and a second antenna;

determining to reduce transmit power of the first antenna based at least in part on the direction;

configuring the first antenna to a reduced level of transmission power based at least in part on the magnitude;

receiving, from the remote network device, a second message informing of a time interval for power increase;

storing the reduced level of transmission power;

configuring the first antenna to increase the level of transmission power; and configuring the first antenna to decrease the level of transmission power to the reduced level of transmission power after the time interval has lapsed.

16. The method of claim 15, wherein the method further comprises:

configuring the first antenna to change direction; and sending a second message to the remote network device to report on the change of the direction.

17. The method of claim 15, wherein the method further comprises sending a second message to the remote network device to confirm changes including a base station identifier and a geographical location of the base station.

* * * * *